United States Patent

Ramsay et al.

[11] Patent Number: 5,261,290
[45] Date of Patent: Nov. 16, 1993

[54] CONTROL LEVER SYSTEM FOR A HYDRAULIC PUMP

[75] Inventors: Lawrence A. Ramsay; Leonard Bergman; Thomas R. Fox, all of Winnipeg, Canada

[73] Assignee: MacDon Industries Ltd., Winnipeg, Canada

[21] Appl. No.: 937,151

[22] Filed: Aug. 31, 1992

[51] Int. Cl.⁵ ............... F16H 59/02; G05G 5/16; G05G 5/03
[52] U.S. Cl. ........................... 74/475; 74/531
[58] Field of Search ............ 74/473 R, 475, 531

[56] References Cited

U.S. PATENT DOCUMENTS

| | | | |
|---|---|---|---|
| 3,837,235 | 9/1974 | Peterson | 74/531 |
| 4,116,086 | 9/1978 | Langford et al. | 74/475 X |
| 4,297,909 | 11/1981 | Crouse | 74/475 X |
| 4,346,618 | 8/1982 | Sakamoto et al. | 74/531 X |

*Primary Examiner*—Allan D. Herrmann
*Attorney, Agent, or Firm*—Adrian D. Battison; Stanley G. Ade; Murray E. Thrift

[57] ABSTRACT

A control lever system for actuating the hydraulic pump of a hydrostatic transmission system of an agricultural vehicle includes a lever having a hand grip portion for actuation by the operator. The lever passes through an elongate slot in a console surface to control its movement. A lower end of the lever is connected to the pump. A friction resistance system is applied to the lever to generate a frictional force resisting the natural restoring force of the pump tending to move to the neutral postion. The friction resistance is applied only over the length of the slot relating to the forward movement of the pump so that there is no action at the neutral position or in reverse. The friction resistance includes a friction multiplier generated by a sub-lever portion pivotally mounted on the lever and biased by spring action when in contact with an abutment member to pinch a friction band so that the friction force generated by the band is greater than the spring action. The lever is shaped by an offset and by the inclination of the hand grip portion so that when pushed or pulled to move the lever from a set position the frictional resistance is reduced during movement and then automatically reapplied when the lever is released.

18 Claims, 3 Drawing Sheets

CONTROL LEVER SYSTEM FOR A HYDRAULIC PUMP

This invention relates to a control lever system for a hydraulic pump of a type which can be manually actuated by an operator to control actuation of the pump through a linkage system.

BACKGROUND OF THE INVENTION

It is becoming more common place for agricultural vehicles to be driven and controlled by hydraulic systems. These hydraulic systems include a hydraulic pump which is rotated by a suitable prime mover generally at a constant or governed speed. The fluid output from the pump is then controlled by a pump lever which actuates a control plate within the pump from a neutral position at which no fluid is generated to a forward position in which fluid is pumped in a first direction and to a reverse position in which fluid is pumped in the opposed direction. The pump lever does of course move from a position at the neutral location initially to a position of minimum fluid pumping and gradually therefrom to a position of maximum fluid pumping.

Generally the pump itself includes a neutral locator which automatically moves the pump lever to the neutral position and holds it at the neutral position in the absence of a actuating force on the pump lever from a control linkage.

When the pump lever is in the forward or reverse positions a significant force is applied to the pump lever in a direction depending on the pump operating pressures. It is necessary therefore to provide a holding force through the control linkage which holds the pump lever at the required set position.

The holding force requires a frictional resistance to movement in the control linkage which is sufficient to overcome the restoring force generated by the pump. If this holding force is applied to the control linkage at all times then the operator must apply to the control lever a force greater than the holding force to actuate movement of the control lever to the required position. As the operator of the system may be required to adjust the postion of the control lever on a regular basis, this increased force necessary can become tiring and uncomfortable leading possibly to dissatisfaction in the operator and even to operator error.

Furthermore, the provision of a constant frictional force resisting the restoring force from the pump can interfere with the automatic neutral locating device of the pump.

While the description of the present application relates mainly to the control system for a hydrostatic transmission of an agricultural vehicle, the control system is not so limited and can be used for other hydraulic pump control systems.

SUMMARY OF THE INVENTION

It is one object of the present invention to provide an improved control lever system for a hydraulic pump.

According to a first aspect of the invention there is provided a control lever system for a hydraulic pump comprising a elongate lever, a hand grip member at one end of the lever by which the lever can be grasped and manually moved, a console surface having means defining a guide slot variant through which the lever extends in a direction generally at right angles to the console surface such that the hand grip member is presented to an operator on the operator side of the console surface, the guide slot being substantially elongate and including means indicating a first position of the lever associated with a neutral position of the pump and a second position of the lever indicating increasing values of actuation of the pump, fulcrum means positioned on a side of the console surface opposite to the operator side, the fulcrum means mounting the lever for pivotal movement with degrees of freedom of the movement both longitudinally and transverse to the guide slot, means connecting the lever to the hydraulic pump such that movement of the lever longitudinally of the slot from the first position to the second position causes actuation of the pump, friction resistance means for applying frictional resistance to movement of the lever longitudinally of the guide slot, and spring biasing means, having a predetermined spring force, biasing the lever into contact with the friction resistance means to generate said frictional resistance, said friction resistance means including friction multiplier means.

According to the second aspect of the invention there is provided a control lever system for a hydraulic pump comprising a elongate lever, a hand grip member at one end of the lever by which the lever can be grasped and manually moved, a console surface having means defining a guide slot variant through which the lever extends in a direction generally at right angles to the console surface such that the hand grip member is presented to an operator on the operator side of the console surface, the guide slot being substantially elongate and including means indicating a first position of the lever associated with a neutral position of the pump and a second position of the lever indicating increasing values of actuation of the pump, fulcrum means positioned on a side of the console surface opposite to the operator side, the fulcrum means mounting the lever for pivotal movement with degrees of freedom of the movement both longitudinally and transverse to the guide slot, means connecting the lever to the hydraulic pump such that movement of the lever longitudinally of the slot from the first position to the second position causes actuation of the pump, friction resistance means for applying frictional resistance to movement of the lever longitudinally of the guide slot, and spring biasing means, having a predetermined spring force, biasing the lever into contact with the friction resistance means to generate said frictional resistance, the hand grip portion being inclined to a direction at right angles to the guide slot such that application of the manual force to the hand grip member provides a component of the force in a direction opposed to said spring means.

According to the third aspect of the invention there is provided a control lever system for a hydraulic pump comprising a elongate lever, a hand grip member at one end of the lever by which the lever can be grasped and manually moved, a console surface having means defining a guide slot variant through which the lever extends in a direction generally at right angles to the console surface such that the hand grip member is presented to an operator on the operator's side of the console surface, the guide slot being substantially elongate and including means indicating a first position of the lever associated with a neutral position of the pump and a second position of the lever indicating increasing values of actuation of the pump, fulcrum means positioned on a side of the console surface opposite to the operator side, the fulcrum means mounting the lever for pivotal movement with degrees of freedom of the movement both longitudinally and transverse to the guide slot, means connecting the lever to the hydraulic pump such that movement of the lever longitudinally of the slot from the first position to the second position causes actuation of the pump, friction resistance means for applying frictional resistance to movement of the lever longitudinally of the guide slot, and spring biasing means, having a predetermined spring force, biasing the lever into contact with the friction resistance means to generate said frictional resistance, the lever including a first portion thereof arranged for engagement with said friction resistance means and a second portion thereof offset to one side of the first portion with the second portion extending through the guide slot, the hand grip member extending outwardly to one side of the second portion such that manual force applied to the hand grip portion tends to rotate the first portion of the lever about an axis longitudinal of the second portion of the lever in said direction opposed to said spring means.

According to the fourth aspect of the invention there is provided a control lever system for a hydraulic pump comprising a elongate lever, a hand grip member at one end of the lever by which the lever can be grasped and manually moved, a console surface having means defining a guide slot variant through which the lever extends in a direction generally at right angles to the console surface such that the hand grip member is presented to an operator on the operator side of the console surface, the guide slot being substantially elongate and including means indicating a first position thereof associated with a neutral position of the pump and a second position thereof indicating increasing values of actuation of the pump, fulcrum means positioned on a side of the console surface opposite to the operator side, the fulcrum means mounting the lever for pivotal movement with degrees of freedom of the movement both longitudinally and transverse to the guide slot, means connecting the lever to the hydraulic pump such that movement of the lever longitudinally of the slot from the first position to the second position causes actuation of the pump, friction resistance means for applying frictional resistance to movement of the lever longitudinally of the guide slot and spring biasing means, having a predetermined spring force, biasing the lever into contact with the friction resistance means to generate said frictional resistance, said friction resistance means including the friction multiplier means including sub-lever means, pivot mounting means mounting the sub-lever means on the lever for pivotal movement relative thereto, an abutment member for engaging an end of the sub-lever means remote from the pivot mounting means and friction engagement means for engaging the sub-lever means at a position adjacent to the pivot mounting means, the friction engagement means comprising a band extending between the sub-lever means and the lever and arranged to be pinched there between by force applied to the sub-lever means by the abutment member.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
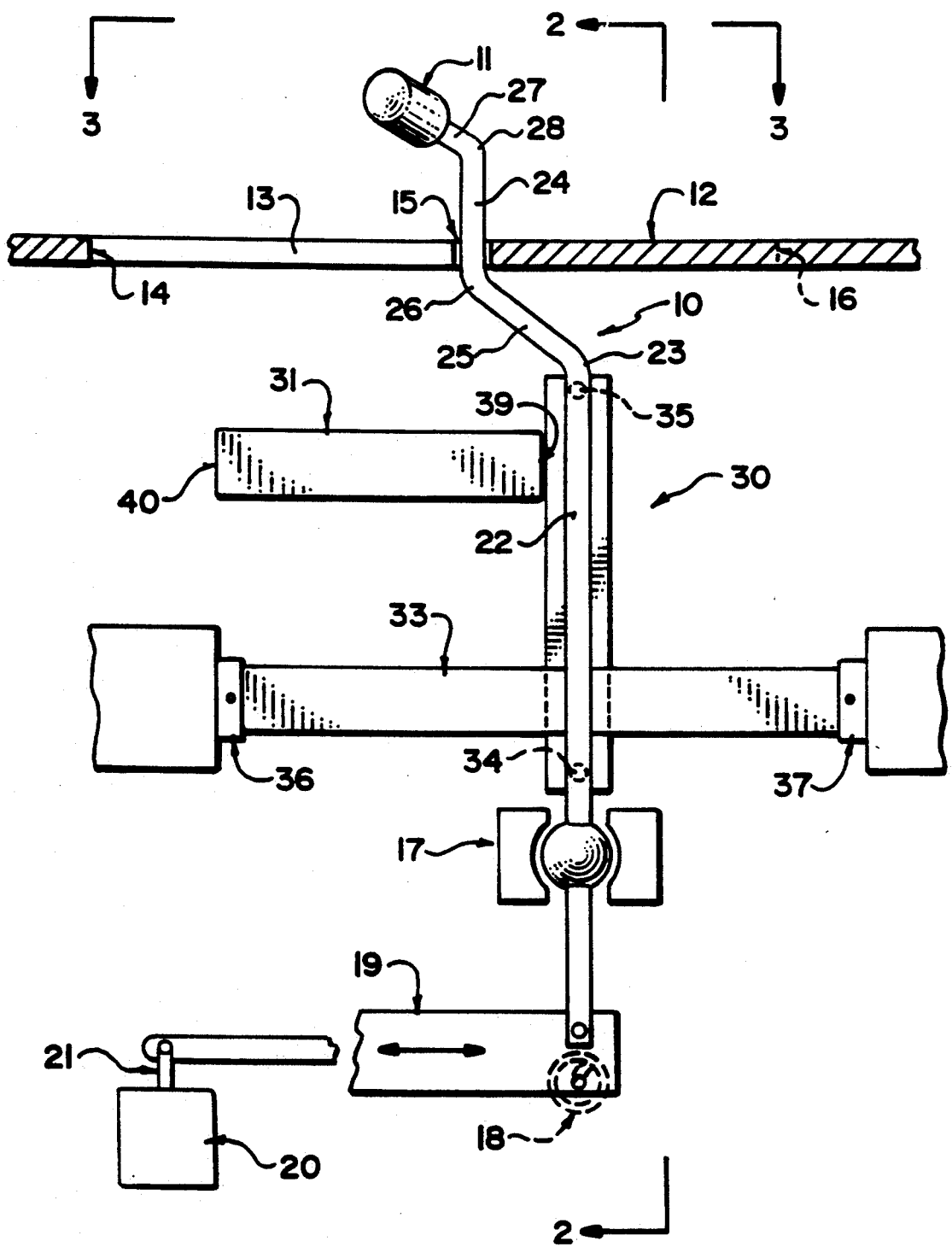
FIG. 1 is a side elevational view of a control lever system according to the present invention showing the pump and pump lever schematically.
Figure 2:
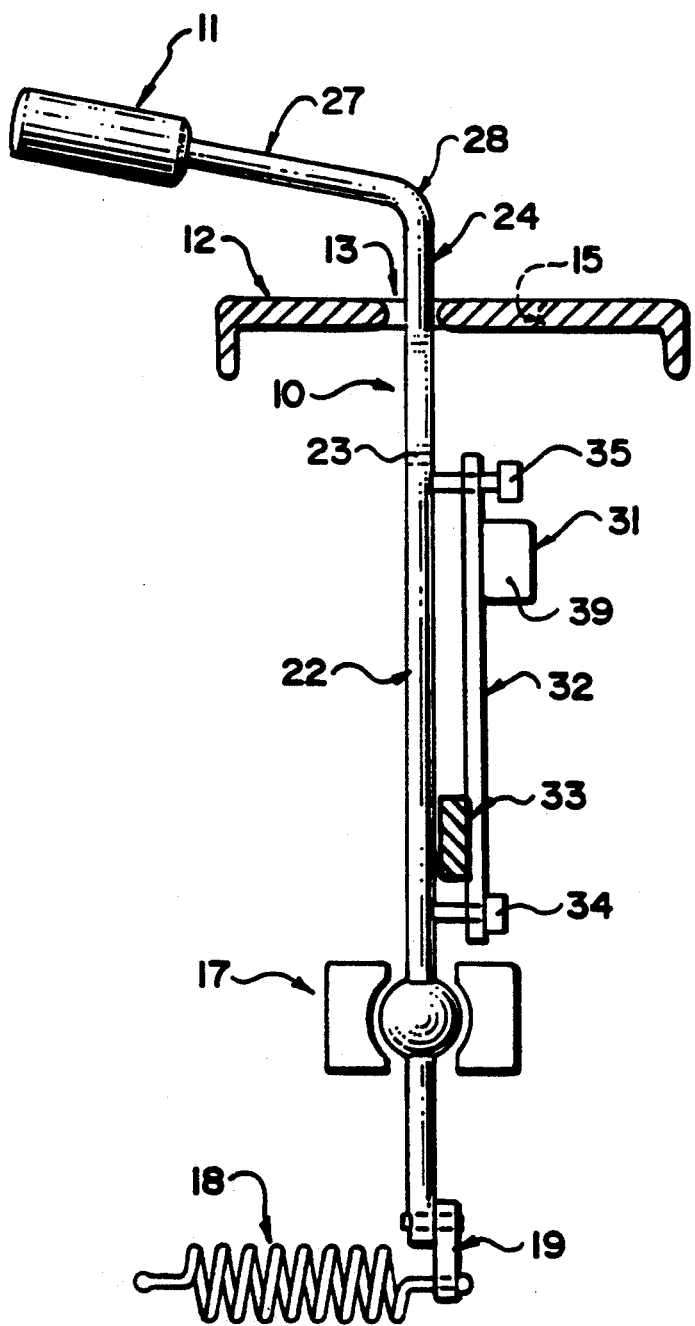
FIG. 2 is a view along the lines 2—2 of FIG. 1.
Figure 3:
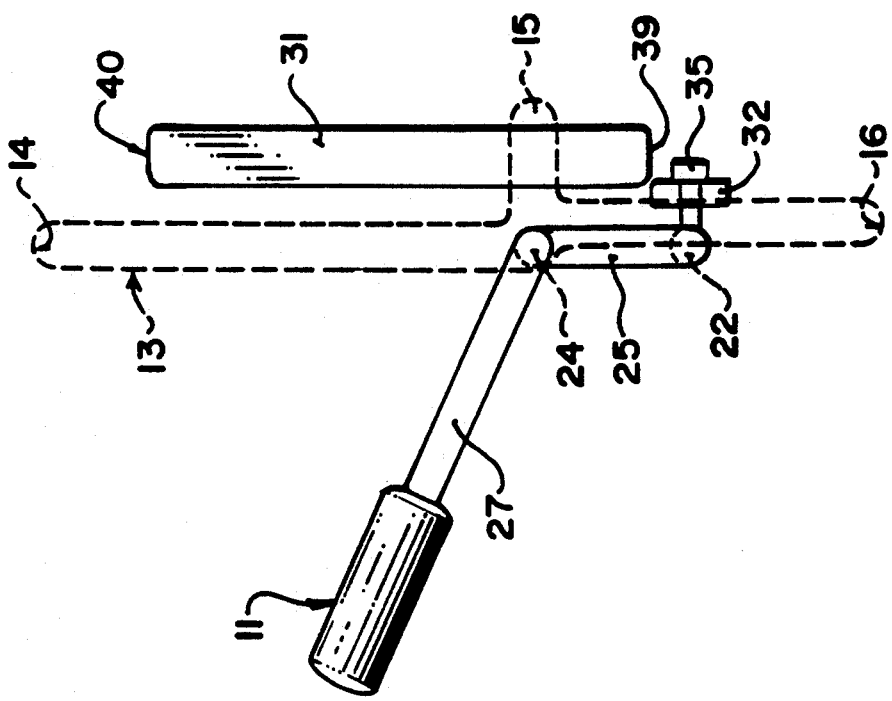
FIG. 3 is a view along the lines 3—3 of FIG. 1 with a lower part of the lever and the friction member omitted for convenience of illustration.

The control lever system illustrated in FIGS. 1, 2 and 3 includes a control lever 10 having at its upper end a manually graspable hand grip portion 11 by which the lever can be grasped and manually moved to a required control position. The lever passes through a console surface 12 within which is defined at slot 13 which generally defines a path of movement of the lever in its control action.

The shape of the slot 13 is best shown in dotted line in FIG. 3 and is generally elongate extending from a forward most end 14 to an intermediate neutral position 15 and beyond that position to a rearwardmost end 16. Between the ends of the slot 14 and 16, the slot is generally elongate and extends generally in a straight line. The neutral position 15 however includes a notch portion which extends outwardly to one side of the elongate slot. Furthermore the portion of the slot between the neutral position 15 and the end 16 is slightly offset from the forward portion between the neutral position 15 and the forward end 14. Such a slot arrangement is well known and the forward portion corresponds to a forward direction of operation of the hydraulic pump to be controlled by the lever and the rearward portion corresponds to a reverse operation of the pump. As is of course conventional the position of the lever along the length of the slot determines the amount of pumping action generated by the pump so that the pumping action gradually increases from the neutral position to the forward most position 14 and symmetrically gradually increases from zero at the neutral position to a full reverse condition at the position 16.

The lever 10 is mounted for pivotal movement on a ball and socket mounting generally indicated at 17 and shown only schematically. This ball and socket mounting allows pivotal movement with two degrees of freedom so that the upper part of the lever at the console surface 12 can pivot longitudinally of the slot 13 and also transversely to the slot. In addition, the ball and socket mounting 17 allows rotation of the lever 10 about its longitudinal axis.

At the lower end of the lever is provided a spring 18 which is illustrated as a tension spring extending toward the left hand side as shown in FIG. 2 both tending to pull the lower end of the lever beneath the mounting 17 toward the left so that the upper end of the lever is pulled toward the right.

At the lower end of the lever is attached a control strap 19 which extends from the lever in a direction generally parallel to the slot 13. The strap is moved by the operation of the lever to control a hydraulic pump schematically indicated at 20 and including a pump lever 21. Hydraulic pumps of this type are well known and include a control plate which controls the operation of the pump to generate fluid pressure in a forward direction, in a reverse direction and in a neutral position. The pump includes a neutral locking device which holds the pump at the neutral position.

The lever 10 includes a first portion 22 which is straight and extends from the lower end of the strap 19 to a position adjacent to but spaced downwardly from the console surface 13 and indicated at 23. The lever further includes a second portion 24 which is parallel to the first portion 22 but is offset to one side thereof by an inclined portion 25 extending between the top end of 23 of the portion 22 and a bottom end 26 of the second portion 24. As shown best in FIG. 3, the inclined portion 25 lies parallel to the slot 13. The portion 24 of the lever extends through the slot generally at right angles to the console surface and in view of the two degrees of freedom of movement of the lever is free to contact the sides of the slot. The portion 22 of the lever is thus offset as shown in FIG. 3 to a position beneath the slot closer to the end 16.

The hand grip member 11 is attached to a portion 27 of the lever which is attached to an upper end 28 of the portion 24 and is cranked relative to the portion 24 in a direction forwardly and outwardly to one side as shown in FIG. 3 and also slightly upwardly as shown in FIG. 2. Thus the portion 27 is inclined relative to a line in the plane of the console surface and at right angles to the slot 13.

An assembly for applying frictional resistance to the movement of the lever 10 is generally indicated at 30. This includes a fixed abutment 31, a sub-lever 32 and a friction band 33.

The sub-lever 32 is attached to the portion 22 of the lever 10 at a position at the top of the portion 22 and extending downwardly therefrom to a position adjacent the mounting 17. The sub-lever 32 is attached at its lower end on a pin 34 mounted on the lever 10 and extending therefrom toward the right as shown in FIG. 2. At its upper end the sub-lever is mounted on a similar pin 35. The sub-lever 32 comprises a rigid flat strap which is mounted on the pins by holes through the strap so that the sub-lever can slide on the pins towards and away from the portion 22 with the outward movement being limited by a head on each of the pins 34, 35.

The friction band 33 comprises a flexible band of a suitable friction material which is clamped at its ends 36 and 37 to suitable structural members of the system. The band 33 is thus fixed in position and extends at right angles to the lever 10 and parallel to the slot 13. The band 33 is located between the portion 22 and the sub-lever 32 so that it can be pinched by inward movement of the sub-lever 32 toward the portion 22. Such movement is generated by pivotal action of the sub-lever about the pin 34 so the head of the pin holds the lower end of the sub-lever at a substantially constant spacing from the portion 22 at the lower end while the upper end pivots towards and away from the portion 22 thus pinching and releasing the friction band 33. The lower pin 34 acts as a pivot mounting means for the lower end of the sub-lever 32 while the upper pin 35 acts to guide the pivotal movement of the upper end of the sub-lever 32 in a direction longitudinal of the pin 35.

Force against the upper part of the sub-lever 32 tending to move it toward the portion 22 of the lever 10 is provided by the abutment member 31. This abutment member is located at a position adjacent the top of the sub-lever 32 and extends parallel to the slot 13 and thus parallel to the band 33. The abutment member 31 has a first end 39 and a second end 40. The end 39 is arranged such that in the neutral position of the lever shown in FIGS. 1, 2 and 3, the sub-lever 32 is free from contact with the abutment member 31 thus allowing the portion 24 of the lever to move into the notch at the neutral position 15. This movement is actuated by the spring 18 which applies a constant force on the upper part of the lever tending to move it to the right as shown in FIGS. 2 and 3. The end 39 of the abutment member is positioned so that immediately the lever moves from the neutral position into the forward portion of the slot the sub-lever engages the abutment member. The end 40 of the abutment member is positioned so that the sub-lever 32 continues in contact with the abutment member along the full movement of the lever from a neutral postion to the extreme end 14 of the slot.

In operation, frictional resistance to the movement of the lever is applied only over the range of movement of the lever from the neutral position forward towards the end 14 of the slot 13. At the neutral position the sub-lever 32 is free from the abutment member 31 so that there is no pinching action on the friction band 33. Therefore in the neutral position the neutral seeking action of the pump itself can operate unrestricted by any frictional action.

Also in the reverse position from a neutral position toward the end 16 of the slot 13 there is again no frictional action and it is necessary therefor for the operator to hold the lever in the reverse position against the restoring force from the pump itself. This is a desirable objective in order that the operator is obliged to be active in holding the pump in the reverse position so that reverse is not automatically retained.

In the forward position of the lever, which is of course the normal operating position, the friction resistance system operates in that the spring 18 pushes the lever 10 toward the right thus pressing the sub-lever 32 onto the abutment member and tending to pivot the sub-lever towards the portion 22 of the lever to pinch the friction band 33. The mechanical advantage generated by the sub-lever and the pinching action provides a friction multiplier so that the frictional force is significantly greater than the spring force generated by the spring 18 and greater than the frictional force which would be generated by simple contact of the lever against a friction pad under force from the spring 18. The spring 18 can therefore be relatively light so the movement of the lever by manual operation is also relatively light. The friction multiplier effect generated by the sub-lever 32 however generates sufficient friction from the relatively light spring to hold the lever against movement under the restoring force from the pump. The operator can thus release the lever and it will remain in position as set by the manual movement of the operator.

Figure 4:
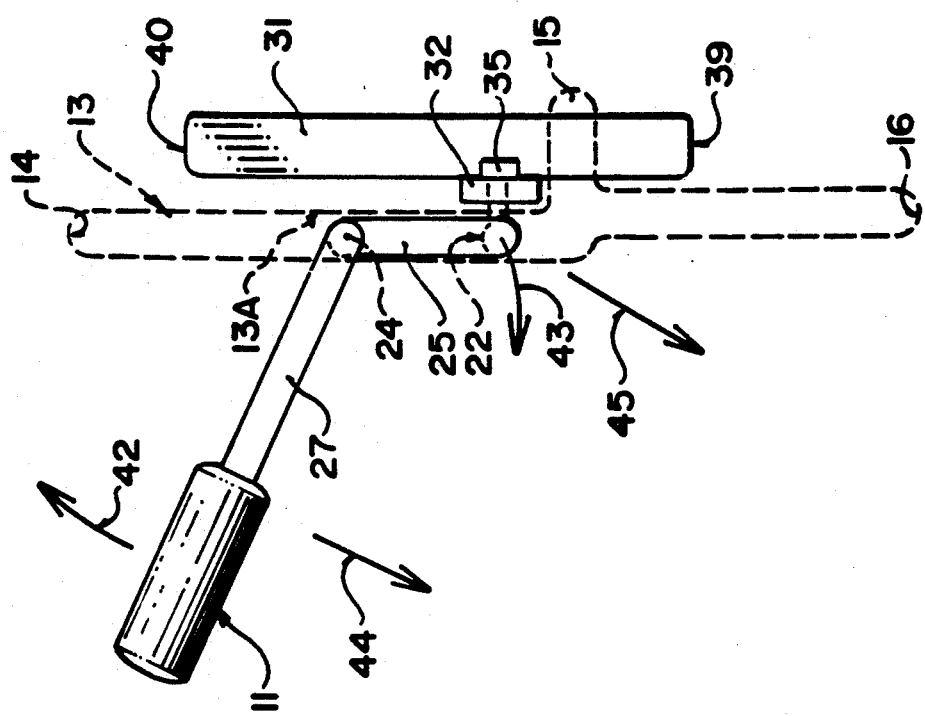
FIG. 4 is a view similar to FIG. 3 showing the lever moved to a forward position from the neutral position showing FIGS. 1, 2 and 3 and showing the forces on the lever applied by manual operation of the hand grip member.

In the event that the operator wishes to change the set position in order to speed up or reduce the pump action, the operator grasps the hand grip portion 11. In order to increase the pump action, the operator pushes on the hand grip portion 11. This position is shown in FIG. 4 in which it will be noted that the lever portion 24 is part way along the forward part of the slot 13 and the sub-lever 32 is in engagement with the abutment member 31. In the pushing action, the portion 24 of the lever is pressed against the side 13A of the slot 13. This tends to rotate the lever about its longitudinal axis with the engagement between the portion 24 and the side wall 13A of the slot acting as a fulcrum. The hand grip portion 11 thus tends to move in a rotational direction indicated by arrow 42 and similarly the portion 22 of the lever tends to rotate in the direction of the arrow 43. As shown in FIG. 4 this rotation in the direction of the arrow 43 tends to move the sub-lever 32 away from the abutment member 31 thus reducing the pinching effect on the band 33. Thus the action of pushing the lever to move the lever to a position of increased pump action tends to reduce the friction effect while the lever is pushed so that the operator can move the lever to a new set position under reduced friction effect. As soon as the force is removed from the hand grip member 11, the rotation effect is removed and the friction effect by the pinching of the band 33 is restored.

When it is required to reduce the pumping action, the hand grip member 11 is again grasped and pulled. As shown in FIG. 4 the inclination of the portion 27 of the lever relative to a line at right angles to the slot 13 tends to apply a force on the portion 27 at right angles to its length and thus along the line of the arrow 44. Similarly this applies a force along the line of the arrow 45 to the portion 22 of the lever so this force 45 has a component in the direction to move the lever along the slot and a component in a direction to move the portion 22 and the sub-lever 32 away from the abutment member 31 thus reducing the friction effect.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A control lever system for a hydraulic pump comprising a elongate lever, a hand grip member at one end of the lever by which the lever can be grasped and manually moved, a console surface having means defining a guide slot therein through which the lever extends in a direction generally at right angles to the console surface such that the hand grip member is presented to an operator on the operator side of the console surface, the guide slot being substantially elongate and including means indicating a first position of the lever associated with a neutral position of the pump and a second position of the lever indicating increasing values of actuation of the pump, fulcrum means positioned on a side of the console surface opposite to the operator side, the fulcrum means mounting the lever for pivotal movement with degrees of freedom of the movement both longitudinally and transverse to the guide slot, means connecting the lever to the hydraulic pump such that movement of the lever longitudinally of the slot from the first position to the second position causes actuation of the pump, friction resistance means extending longitudinally of the guide slot against which the lever contacts so as to apply frictional resistance to movement of the lever longitudinally of the guide slot, and spring biasing means, having a predetermined spring force arranged in a direction transverse to the friction resistance means, biasing the lever into contact with the friction resistance means to generate said frictional resistance, said friction resistance means including friction multiplier means using mechanical advantage to generate a multiplied frictional resistance, the fulcrum means allowing movement of the lever under manual force from the hand grip in a direction transverse to the friction resistance means and opposite to said spring force and thus to reduce said multiplied frictional resistance.

2. The system according to claim 1 wherein the hand grip member is arranged relative to the lever such that force applied manually thereto in a direction to move the lever longitudinally of the guide slot causes a force on the lever in a direction opposed to said spring means so as to reduce the frictional resistance while the manual force is applied to the lever.

3. The system according to claim 2 wherein the hand grip portion is inclined to a direction at right angles to the guide slot such that application of the manual force to the hand grip member provides a component of the force in a direction opposed to said spring means.

4. The system according to claim 2 wherein the lever includes a first portion thereof arranged for engagement with said friction resistance means and a second portion thereof offset to one side of the first portion with the second portion extending through the guide slot, the hand grip member extending outwardly to one side of the second portion such that manual force applied to the hand grip portion tends to rotate the first portion of the lever about an axis longitudinal of the second portion of the lever in said direction opposed to said spring means.

5. The system according to claim 1 wherein the friction resistance means is arranged such that the lever when located at said first position is free from operation of the friction resistance means.

6. The system according to claim 1 wherein the guide slot includes a third position of the lever indicating increasing values of actuation of the pump in a direction reverse to the direction of the second position and wherein the friction resistance means is arranged such that the lever when located at said third position is free from operation of the friction resistance means.

7. The system according to claim 1 wherein the friction multiplier means includes sub-lever means carried by said lever and arranged to provide mechanical advantage so as to multiply the effect of the spring.

8. The system according to claim 7 including pivot mounting means mounting the sub-lever means on the lever for pivotal movement relative thereto and wherein the friction multiplier means further includes an abutment member for engaging an end of the sub-lever means remote from the pivot mounting means and friction engagement means for engaging the sub-lever means at a position adjacent to the pivot mounting means.

9. The system according to claim 8 wherein the friction engagement means comprises a band extending between the sub-lever means and the lever and arranged to be pinched there between by force applied to the sub-lever means by the abutment member.

10. A control lever system for a hydraulic pump comprising a elongate lever, a hand grip member at one end of the lever by which the lever can be grasped and manually moved, a console surface having means defining a guide slot therein through which the lever extends in a direction generally at right angles to the console surface such that the hand grip member is presented to an operator on the operator side of the console surface, the guide slot being substantially elongate and including means indicating a first position of the lever associated with a neutral position of the pump and a second position of the lever indicating increasing values of actuation of the pump, fulcrum means positioned on a side of the console surface opposite to the operator side, the fulcrum means mounting the lever for pivotal movement with degrees of freedom of the movement both longitudinally and transverse to the guide slot, means connecting the lever to the hydraulic pump such that movement of the lever longitudinally of the slot from the first position to the second position causes actuation of the pump, friction resistance means for applying frictional resistance to movement of the lever longitudinally of the guide slot, and spring biasing means having, a predetermined spring force, biasing the lever into contact with the friction resistance means to generate said frictional resistance, the hand grip portion being inclined to a direction at right angles to the guide slot such that application of the manual force to the hand grip member provides a component of the force in a direction opposed to said spring means.

11. The system according to claim 10 wherein the lever includes a first portion thereof arranged for engagement with said friction resistance means and a second portion thereof offset to one side of the first portion with the second portion extending through the guide slot, the hand grip member extending outwardly to one side of the second portion such that manual force applied to the hand grip portion tends to rotate the first portion of the lever about an axis longitudinal of the second portion of the lever in said direction opposed to said spring means.

12. The system according to claim 10 wherein the friction resistance means is arranged such that the lever when located at said first position is free from operation of the friction resistance means.

13. The system according to claim 10 wherein the guide slot includes a third position of the lever indicating increasing values of actuation of the pump in a direction reverse to the direction of the second position and wherein the friction resistance means is arranged such that the lever when located at said third position is free from operation of the friction resistance means.

14. The system according to claim 10 wherein the friction resistance means includes friction multiplier means comprising sub-lever means carried by said lever and arranged to provide mechanical advantage so as to multiply the effect of the spring.

15. The system according to claim 14 including pivot mounting means mounting the sub-lever means on the lever for pivotal movement relative thereto and wherein the friction multiplier means further includes an abutment member for engaging an end of the sub-lever means remote from the pivot mounting means and friction engagement means for engaging the sub-lever means at a position adjacent to the pivot mounting means.

16. The system according to claim 14 wherein the friction engagement means comprises a band extending between the sub-lever means and the lever and arranged to be pinched therebetween by force applied to the sub-lever means by the abutment member.

17. A control lever system for a hydraulic pump comprising a elongate lever, a hand grip member at one end of the lever by which the lever can be grasped and manually moved, a console surface having means defining a guide slot therein through which the lever extends in a direction generally at right angles to the console surface such that the hand grip member is presented to an operator on the operator's side of the console surface, the guide slot being substantially elongate and including means indicating a first position of the lever associated with a neutral position of the pump and a second position of the lever indicating increasing values of actuation of the pump, fulcrum means positioned on a side of the console surface opposite to the operator side, the fulcrum means mounting the lever for pivotal movement with degrees of freedom of the movement both longitudinally and transverse to the guide slot, means connecting the lever to the hydraulic pump such that movement of the lever longitudinally of the slot from the first position to the second position causes actuation of the pump, friction resistance means for applying frictional resistance to movement of the lever longitudinally of the guide slot, and spring biasing means, having a predetermined spring force, biasing the lever into contact with the friction resistance means to generate said frictional resistance, the lever including a first portion thereof arranged for engagement with said friction resistance means and a second portion thereof offset to one side of the first portion with the second portion extending through the guide slot, the hand grip member extending outwardly to one side of the second portion such that manual force applied to the hand grip portion tends to rotate the first portion of the lever about an axis longitudinal of the second portion of the lever in said direction opposed to said spring means.

18. A control lever system for a hydraulic pump comprising a elongate lever, a hand grip member at one end of the lever by which the lever can be grasped and manually moved, a console surface having means defining a guide slot therein through which the lever extends in a direction generally at right angles to the console surface such that the hand grip member is presented to an operator on the operator side of the console surface, the guide slot being substantially elongate and including means indicating a first position thereof associated with a neutral position of the pump and a second position thereof indicating increasing values of actuation of the pump, fulcrum means positioned on a side of the console surface opposite to the operator side, the fulcrum means mounting the lever for pivotal movement with degrees of freedom of the movement both longitudinally and transverse to the guide slot, means connecting the lever to the hydraulic pump such that movement of the lever longitudinally of the slot from the first position to the second position causes actuation of the pump, friction resistance means for applying frictional resistance to movement of the lever longitudinally of the guide slot and spring biasing means, having a predetermined spring force, biasing the lever into contact with the friction resistance means to generate said frictional resistance, said friction resistance means including friction multiplier means including sub-lever means, pivot mounting means mounting the sub-lever means on the lever for pivotal movement relative thereto, an abutment member for engaging an end of the sub-lever means remote from the pivot mounting means and friction engagement means for engaging the sub-lever means at a position adjacent to the pivot mounting means, the friction engagement means comprising a band extending between the sub-lever means and the lever and arranged to be pinched therebetween by force applied to the sub-lever means by the abutment member.

* * * * *